United States Patent
Mutoh et al.

[11] Patent Number: 5,703,414
[45] Date of Patent: Dec. 30, 1997

[54] ANTI-THEFT APPARATUS WHICH PERMITS THE ENGINE TO START PRIOR TO ID SIGNAL DISCRIMINATION

[75] Inventors: Eiji Mutoh; Suguru Asakura; Akira Nagai, all of Saitama-ken, Japan

[73] Assignee: Honda Giken Kogyo Kabushiki Kaisha, Tokyo, Japan

[21] Appl. No.: 832,175

[22] Filed: Apr. 8, 1997

Related U.S. Application Data

[63] Continuation of Ser. No. 545,206, Oct. 19, 1995, abandoned.

[30] Foreign Application Priority Data

Oct. 28, 1994 [JP] Japan .................. 6-287156

[51] Int. Cl.$^6$ ........................................ B60R 25/04
[52] U.S. Cl. ............... 307/10.5; 180/287; 340/825.72
[58] Field of Search ........................ 307/10.1–10.6; 180/287; 340/425.5, 426, 825.3–825.32, 825.34, 825.44, 825.54, 825.69, 825.72; 123/179.2–179.4, 198 DB, 198 DC

[56] References Cited

U.S. PATENT DOCUMENTS

| | | | |
|---|---|---|---|
| 3,784,839 | 1/1974 | Weber | 307/10.4 |
| 4,023,358 | 5/1977 | Maurer et al. | 123/198 DB |
| 4,240,516 | 12/1980 | Henderson et al. | 307/10.5 |
| 4,291,237 | 9/1981 | Kitano | 180/287 |
| 4,366,466 | 12/1982 | Lutz | 180/287 |
| 4,965,460 | 10/1990 | Tanaka et al. | 307/10.2 |
| 5,243,322 | 9/1993 | Thompson et al. | 307/10.2 |
| 5,397,925 | 3/1995 | Carlo et al. | 307/10.3 |
| 5,473,200 | 12/1995 | Woo | 307/10.2 |
| 5,519,376 | 5/1996 | Iijima | 307/10.2 |
| 5,539,260 | 7/1996 | Khangura et al. | 307/10.3 |

FOREIGN PATENT DOCUMENTS 0 372 741  6/1990  European Pat. Off. .
2046827  11/1980  United Kingdom .

*Primary Examiner*—Richard T. Elms
*Attorney, Agent, or Firm*—Pollock, Vande Sande & Priddy

[57] ABSTRACT

An anti-theft apparatus prevents a delay in engine start caused by an ID legitimacy determination performed by an immobilizer. When an ignition key is operated, a starter motor is immediately energized and an engine control unit and a theft detector are actuated at the same time. Then, when independent running of the engine is detected by a detector, an immobilization determining section determines whether an enable code has been provided from the theft detector. If no enable code is present, then the immobilization determining section issues a halt command to the engine control unit. Thus, as soon as the key is turned to the on-position, the engine is started, thereby preventing a delay in engine start caused by the ID determination performed by the immobilizer.

8 Claims, 5 Drawing Sheets

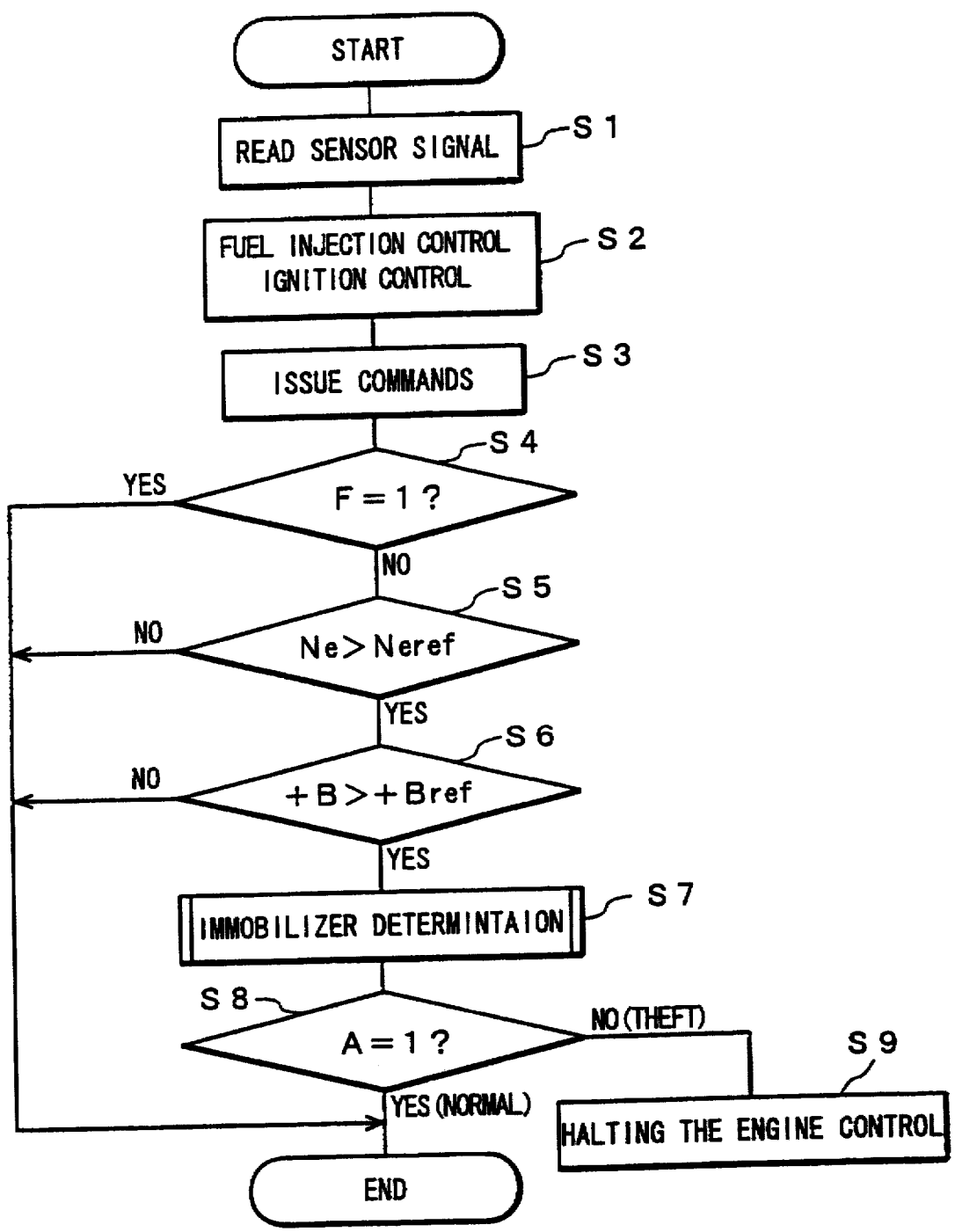

ANTI-THEFT APPARATUS WHICH PERMITS THE ENGINE TO START PRIOR TO ID SIGNAL DISCRIMINATION

This application is a continuation of U.S. patent application Ser. No. 08/545,206, filed Oct. 19, 1995 now abandoned.

BACKGROUND OF THE INVENTION

1. Field of the Invention

The present invention relates to an anti-theft apparatus and, more particularly, to an anti-theft apparatus designed to determine that a starting operation is legitimate provided when an ID code, which has been registered in an engine key beforehand, coincides with another ID code which has been registered in a vehicle beforehand.

2. Description of the Related Art

In some of the various proposals for preventing the theft of a vehicle such as a car, the vehicle is prevented from being started or it is immobilized by mechanical and/or electrical means when it is attempted to be started or moved by using a wrong ignition key. This is achieved by previously storing an identification code or a key ID code in a key, reading the key ID code when the key is inserted into a key cylinder to start the vehicle, comparing it with a reference ID code prestored in the vehicle side, generating an enable signal and enabling the engine to be started up only when there is a match between both ID codes. In this case, since a theft may be committed by mechanical breakage or illegal wiring if the enable signal is a simple binary signal of on/off, the encoding of the enable signal has been proposed, for instance, in the "Car Technology", Vol. 48, No. 8, 1994, pp. 59–64.

An example of such a conventional transponder type immobilizer is shown in FIG. 6. An ignition key 2 includes a memory (not shown) in which a key ID code (for instance, of 64 bits) is prestored, and a transmitter 4 for transmitting the key ID code. The transmitter 4 in the key 2 and a key cylinder 5 are coupled together by, for instance, induction coils (antenna) 6. When the key 2 is inserted into the key cylinder 5 and rotated to the ignition position, an ignition switch 7 is closed. In response to this, an immobilizer CPU 13 operates, and operating electric power is supplied from a power amplifier 11 of an immobilizer ECU 10 to the transmitter 4 through the coils (antenna) 6. The transmitter 4 responds to this to read the key ID code, and transmits it to the key cylinder 5 side.

The received key ID code is detected and digitized by a R/F (radio frequency) circuit 12 in the immobilizer 10, and read into the CPU 13 and temporarily stored in an appropriate ID code register 13B in the CPU 13. In an EEPROM 13A of the CPU 13, a unique reference ID code assigned to each vehicle is prestored, and the reference ID code and the key ID code which was read in are compared with each other by a compare unit 13S of the CPU 13. If it is determined that there is a match between the two ID codes or they are in a predetermined relationship, an enable code is transmitted from the compare unit 13S to an engine control unit (ECU) 16. At the same time, a starter relay is activated to initiate the rotation of a starter motor (not shown).

When the ECU 16 completes the determination and verification of the reception of the enable code, it controls a fuel injection valve 17, a fuel pump 18, an ignition control unit 20, etc. according to a predetermined procedure and timing, thereby enabling the vehicle to start and run. On the other hand, if the reference ID code stored in the EEPROM 13A and the key ID code transmitted from the key 2 and read in do not match each other or they are not in a predetermined relationship, the compare unit 13S does not issue an enable code. Accordingly, the start of the vehicle by the ECU 16 is inhibited, and a warning device 14 is activated by the CPU 13 to provide an appropriate alarm and display. Thus, an illegal start-up and running of the engine by a wrong key is prevented, thereby ensuring the prevention of a vehicle theft.

The construction according to the prior art described above inevitably involves a time delay before the engine is actually started when the driver tries to start up the engine. More specifically, the engine is not started until the whole process including the reading and the judgment of the ID code, and the transmission of the enable code is completed after the key 2 is inserted, causing an incoherent feeling to the driver.

There is another apparatus disclosed in Japanese Patent Laid-Open No. 54-15832. The apparatus is designed to check for the coincidence of a key signal and a code signal after an engine has been driven by a starter, then to carry out actual engine control, which includes the operation for ignition control and the operation for fuel injection control, after the checking has been completed. This prior art apparatus, however, also suffers from a time delay in the start of normal operation after ignition of the engine, leaving the aforesaid problem unsolved.

SUMMARY OF THE INVENTION

An object of the present invention is to provide an anti-theft apparatus which solves the problem of the prior art stated above and which is capable of eliminating the delay in the engine start while retaining an anti-theft function.

According to one aspect of the present invention, there is provided an anti-theft apparatus which is equipped with: engine control means for starting an engine in response to a switch-ON operation; theft detecting means for determining the nature of an ID signal to check for legitimate engine start operation and for issuing at least one of the following two signals: an enable signal, which allows engine control to be continued if the aforesaid ID signal proves to be legitimate, and a theft signal which prohibits engine control if the aforesaid ID signal proves to be illegitimate; discriminating means for generating a halt instruction if the aforesaid ID signal has been determined to be illegitimate according to an output signal of the aforesaid theft detecting means; and means for stalling the engine by supplying the aforesaid halt instruction to the engine control means.

According to the second aspect of the present invention, the anti-theft apparatus is further provided with complete combustion detecting means for detecting the "complete combustion" of the engine and for issuing a "complete combustion" signal, and the aforesaid discriminating means judges the nature of an output signal of the theft detecting means in response to occurrence of the "complete combustion" signal. The term "complete combustion" used herein means that the engine is running by itself independently of the engine starter motor.

According to the first aspect, if it is determined that the received ID signal does not indicate a legitimate engine starting operation, then the engine control, which has already been started in response to the switch-ON signal, is halted in response to the theft signal.

According to the second aspect, it is determined whether the engine control should be continued or not according to a result given by the theft detecting means as soon as complete combustion, i.e., independent running, of the engine is detected. Thus, the present invention allows the engine control to be started as soon as the ignition key is operated regardless of whether the ID signal indicates a legitimate operation or not, but it halts the engine control if the following judgement result reveals that the ID signal does not indicate a legitimate engine starting operation. This eliminates the delay in starting the engine, which delay is caused by the discrimination of the ID signal.

BRIEF DESCRIPTION OF THE DRAWINGS

FIG. 3 is a flowchart showing a starting operation including the determination by the immobilizer;

DETAILED DESCRIPTION OF THE PREFERRED EMBODIMENT

Figure 6:
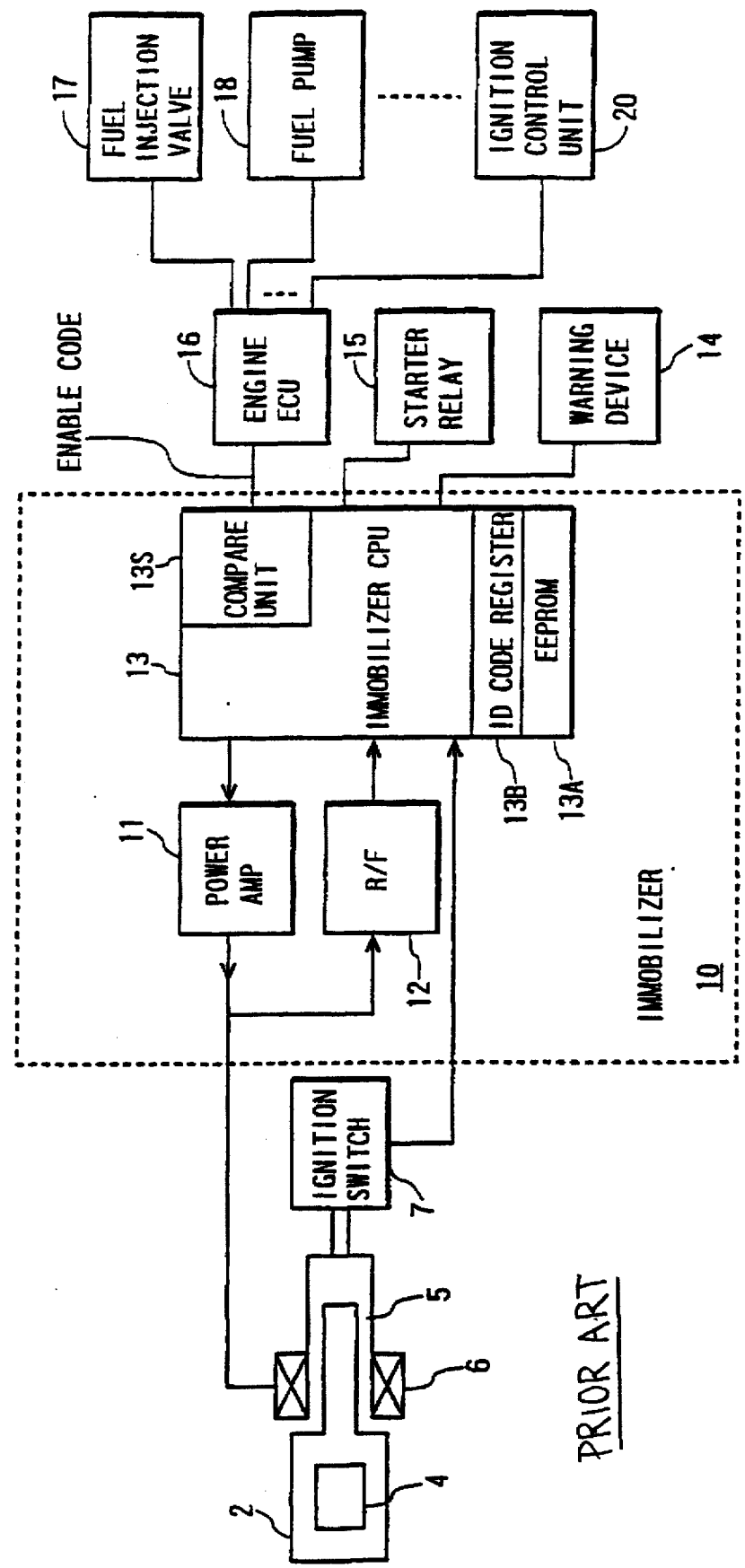
FIG. 6 is a block diagram showing an example of a conventional transponder type immobilizer to which the present invention is suitably applied.

The following describes an embodiment of the present invention in detail with reference to the accompanying drawings. The configuration of the hardware of an engine control unit including an anti-theft apparatus in accordance with the present embodiment is similar to that of the conventional apparatus; therefore, FIG. 6 will be referred in the following description. It should be noted, however, that the enable code received by an engine ECU 16 is supplied to an engine control section 16a (which will be discussed later) via an immobilization determining section 16b which will be discussed later.

Figure 1:
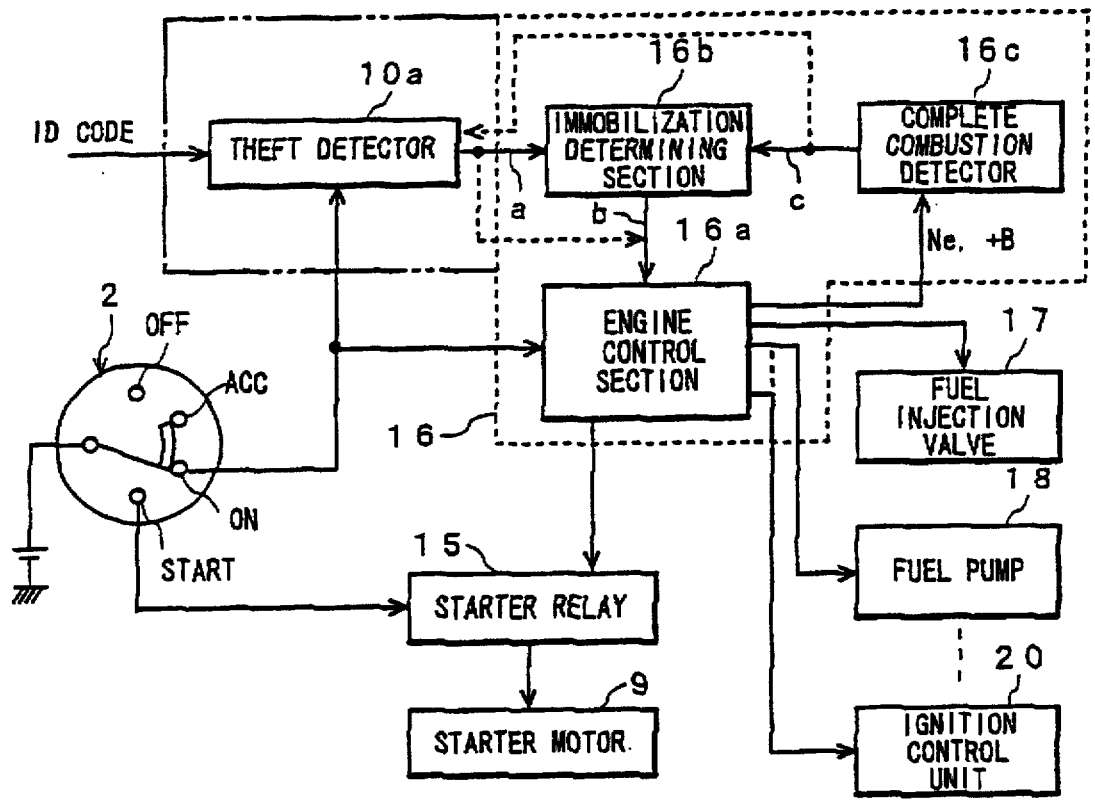
FIG. 1 is a block diagram showing an essential function of an embodiment of the present invention.

First, the essential function of the anti-theft apparatus according to the present embodiment will be described with reference to the block diagram shown in FIG. 1. Setting the ignition key 2 to the ON position as illustrated causes power to be supplied to a theft detector 10a and an engine control unit 16a. Setting the key 2 to the START position supplies power also to a starter relay 15. The theft detector 10a has a function which is equivalent to that of the immobilizer 10.

The moment the power is turned ON, the starter relay 15 is energized and a starter motor 9 begins to rotate. The engine control unit 16a reads detected values of sensors (not shown) such as a TDC sensor for detecting the revolution of the engine and a negative pressure sensor on an inlet pipe and carries out fuel injection control and ignition control to supply commands to various sections including the fuel injection valve 17, the fuel pump 18, and the ignition control unit 20. The theft detector 10a deciphers an ID code supplied from the key 2 when the power is turned ON and determines whether it matches an expected or predetermined ID code.

The theft detector 10a issues a detection signal "a" to the engine ECU 16. The detection signal "a" involves an enable code that is issued if detector 10a finds that the aforesaid two ID codes match or have an expected relationship, and a theft code that is issued if they do not match or do not have the expected relationship. As an alternative, the theft detector 10a issues only one of the enable code and the theft code, so that if one of the two codes is not issued, then it acts as if the other code had been issued. For the purpose of further reliable judgment, two separate terminals may be provided to separately issue the enable code and the theft code.

The enable code and/or the theft code is supplied to the immobilization determining section 16b in the engine ECU 16; the immobilization determining section 16b supplies a control halt instruction b to the engine control section 16a if the theft code is detected or if it does not receive the enable code. The engine control section 16a halts the control operation, which is being implemented, to stall the engine in response to the control halt instruction b.

It is further desirable to design the system so that the engine control section 16a issues a command for turning the starter relay OFF to prevent even the starter motor 9 from running when the control operation is halted. The immobilization determining section 16b preferably performs the discriminating operation after it is determined that the engine is running by itself independently of starter motor 9. A complete combustion detector 16c reads engine rpm Ne and battery voltage +B detected by the engine control unit 16a, and if it finds that said two detected values exceed expected or predetermined values, then it determines that the engine is running by itself and sends an operation start instruction, i.e., an engine running signal c to the immobilization determining section 16b.

Figure 2A:
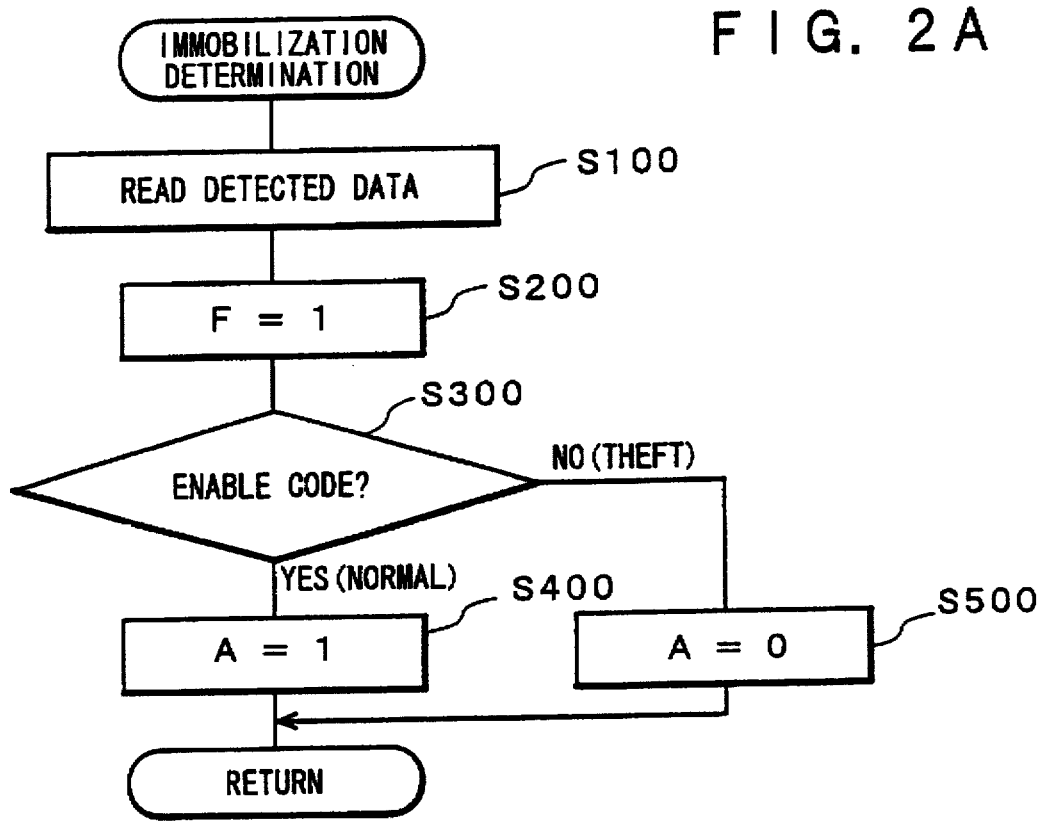
FIGS. 2A and 2B are flowcharts showing a discriminating operation of an immobilizer.

The engine start operation which takes place in the construction stated above will now be described with reference to the flowcharts given in FIGS. 2A and 2B and FIG. 3. First, the operation of the immobilization determining section 16b will be described in conjunction with FIG. 2A. In a step S100, the data such as the enable code supplied from the theft detector 10a is read. In a step S200, flag F is set (F=1). It can be recognized whether the discrimination by the immobilizer has been implemented or not by checking whether flag F has been set or not. In a step S300, the presence of the enable code from the compare unit 13S is determined. If the enable code, i.e. the code indicating the agreement between the ID code and the expected code, is detected, then the system proceeds to a step S400 where it sets flag A (A=1) which indicates the match between the two codes. If the ID code and the expected code do not match, then the system proceeds to a step S500 where it clears flag A (A=0). The determination carried out in the step S300 may be the determination of the presence of the theft code. In this case, however, the following steps are exchanged according to whether the determination result is affirmative or negative.

Figure 2B:
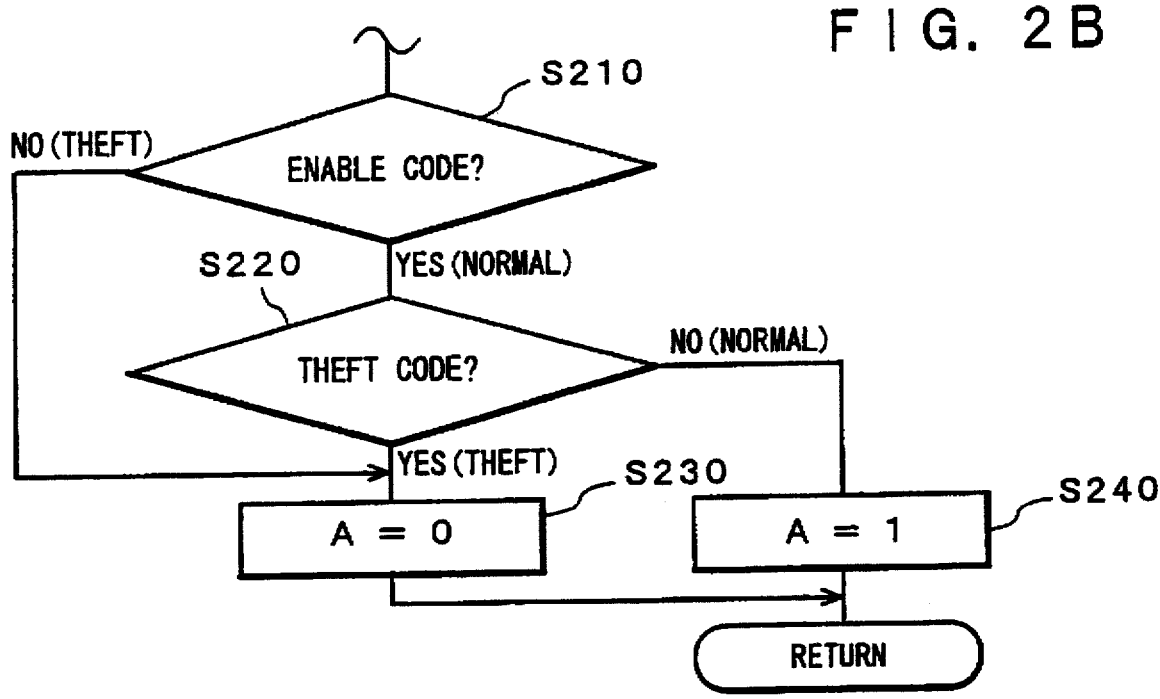

FIG. 2B shows the operation to be carried out when the enable code and the theft code are independently issued in order to ensure more reliable determination by preventing an erroneous code from being given due to some reason. The flowchart of FIG. 2B shows the steps following the step S200. In a step S210, the system checks for the presence of the enable code; if it detects no enable code, then it proceeds to a step S230 where it clears flag A to indicate theft, or if it detects the enable code, then it proceeds to a step S220 to check for the presence of the theft code. If the system does not detect the theft code, then it goes to a step S240 to set flag A to indicate normality. If the theft code is detected in the step S220, then the system advances to the step S230 to clear flag A to indicate the theft even if the enable code is detected in the step S210. Thus, the system determines that the code is erroneous if it finds a contradiction between the enable code and the theft code and it acts as if the theft code had been issued, thereby assuring the prevention of a theft.

The engine start control will now be described. Referring to FIG. 3, in a step S1, the system reads in the values of the TDC sensor, the PB sensor, the battery voltage +B and various other sensors necessary for conducting the engine control. In a step S2, the system performs operations required for the fuel injection control and the ignition control. The contents of the operations are widely known ones for typical fuel injection control, therefore, detailed description will be omitted. In a step S3, the commands for the injection control and the ignition control are issued to the fuel injection valve 17, the ignition control unit 20, etc. in accordance with the results of the aforesaid operations.

In a step S4, it is determined whether the aforesaid flag F is set or not, which flag indicates that the discrimination by the immobilizer has been implemented. If flag F is not set, then the system proceeds to a step S5. In the step S5, it is determined whether the engine rpm Ne exceeds an upper limit value Neref of the rpm range applied when only the starter motor 9 runs, in other words, whether the engine rpm exceeds the upper limit of the starter motor rpm range. The upper limit value Neref of the rpm range is set, for example, to 400 rpm. If the system determines that the engine rpm Ne exceeds the upper limit value Neref, then it advances to a step S8. In step S6, it is determined whether the battery voltage value +B is equal to or over a reference voltage value +Bref which includes an allowance for a possible drop due to load increase when the starter motor 9 is energized. The voltage value +Bref is set, for example, to 8V. The characteristics of the engine rpm Ne, the battery voltage +B, etc. will be discussed later in conjunction with FIG. 4.

If the discrimination results in the steps S5 and S6 are affirmative, then the system decides that the engine is running by itself and proceeds to a step S7 wherein it performs the aforementioned discrimination by the immobilizer (FIGS. 2A and 2B) in the immobilization determining section 18b. In a step S8, the system decides whether flag A has been set or not according to the result of the determination by the immobilizer; if it decides that flag A has been set, then it terminates the processing for one cycle, or if it decides that flag A has not been set, then it advances to a step S9 wherein it supplies the command for halting the engine control to the engine control unit 16a before it terminates the processing.

If the discrimination result in either the step S5 or S6 is negative, then it is determined that the engine is not running by itself: the immobilization determining section 16b will not be actuated and the step S7 and the step S8 will be skipped. Once flag F is set, the determination result in the step S4 becomes affirmative; therefore, the steps S5 to S9 will not be implemented. The flag F is cleared when the engine is stopped. In other words, the discrimination by the immobilizer will be executed only after the engine is running by itself independent of the start motor.

Figure 4:
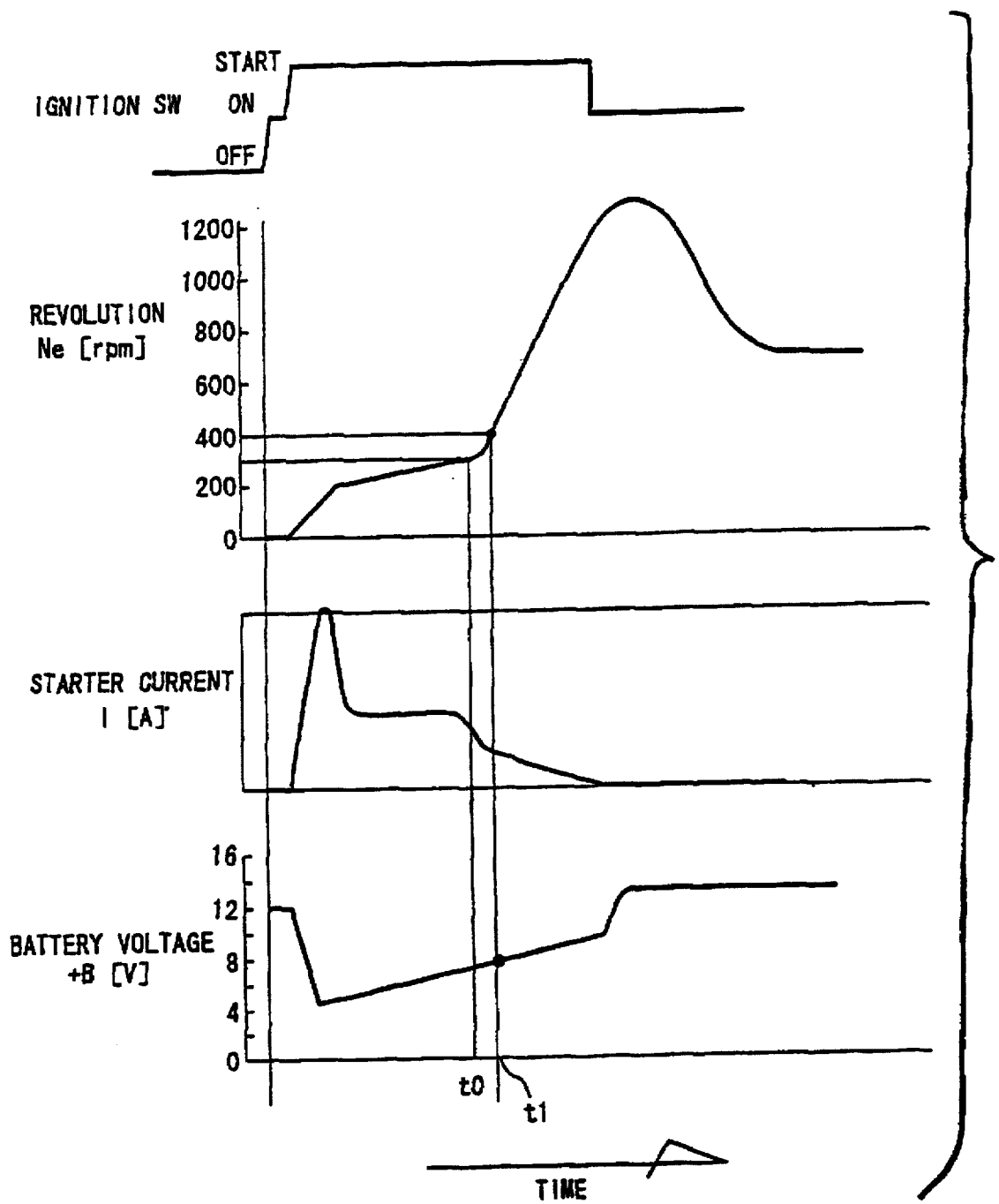
FIG. 4 is a waveform diagram showing the number of revolutions, battery voltage, etc. which are observed when an engine is started.

The characteristics of the engine rpm Ne and the battery voltage +B will now be described. FIG. 4 shows the waveform illustrating the relationship among the operation of the ignition switch 7, the speed Ne, a starter current I, and the battery voltage +B. In the drawing, the moment the key 2 is turned to the start position, the large starter current I flows through the starter motor 9, causing a sudden drop in the battery voltage +B. After that, as the engine is rotated by the starter motor 9, the starter current begins to decrease and the battery voltage +B recovers. At time t0, the engine reaches running range. At time t1, it can be determined that the engine is surely running by itself. The rpm Ne (400 rpm) and the voltage +B (8V) at time t1 can be used as the values of Neref and +Bref for determining complete combustion, i.e., independent running of the engine.

Figure 5:
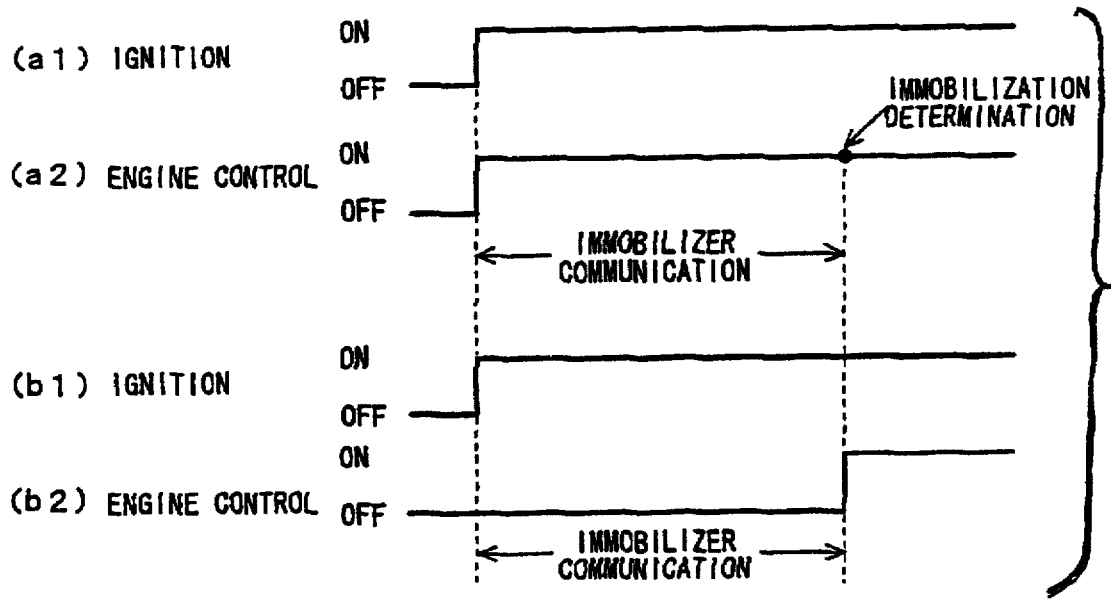
FIG. 5 is a time chart showing the comparison between the operation according to the present invention and the operation of a conventional apparatus.

The operation of the ignition switch and the operation of the engine control unit 16a according to the present embodiment described above will be further described in comparison with those of the conventional apparatus. Waveforms a1 and a2 shown in FIG. 5 indicate the operation of the present embodiment, whereas waveforms b1 and b2 indicate the operation of the conventional apparatus. As illustrated, in both of the embodiment and conventional apparatus, at the moment the ignition switch, i.e. the key 2, is turned ON, the theft detector 10a is actuated, that is, the communication (immobilizer communication) between the key 2 and the theft detector 10a is initiated. The present embodiment, however, is different from the conventional apparatus in that the engine control in the present embodiment is initiated at the moment the key 2 is turned to the start position just as in a vehicle without immobilizer whether the immobilizer communication is completed or not, whereas the prior art engine control is begun after the immobilizer communication is completed.

The above description refers to an example of the anti-theft apparatus which is operated in accordance with the discrimination results of the transponder type immobilizer; the present invention, however, is not limited to the example. The present invention can be applied to other types as well; for example, the present invention can be applied to an anti-theft apparatus which operates in accordance with a discrimination result of an immobilizer designed to determine a theft according to an ID code entered through a keyboard or the like.

The immobilization determining section 16b described above is designed to receive, decipher, and check the detection signal "a" such as the enable code and/or the theft code from the theft detector 10a. Out of the detection signal "a" issued from the theft detector 10a, the theft code may alternatively be supplied as the control halt instruction "b" directly to the engine control unit 16a and the supply timing thereof may be obtained from the engine running signal "c" received from the complete combustion detector 16c (see the dotted arrowhead shown in FIG. 1). The important point is that the engine control is begun as soon as the key is turned to the ignition position and whether the engine control should be halted or continued is decided after independent running of the engine is determined. The theft detector 10a may be combined with the engine ECU 16 to form an IC as shown by the chain line in FIG. 1.

As an alternative, whether the engine control should be halted or continued may be decided regardless of the determination of the running of the engine and the instruction for the engine control according to the decision may be given after the determination of the engine running condition. Furthermore, the running of the engine may be decided on the basis of the affirmative decision in one of the step S5 and S6 in FIG. 3, or any other items and events which are widely known in the field of engine control.

According to the present invention, the engine control is initiated as soon as the ignition switch is turned ON. This prevents the delay in the start of the engine, which delay is caused by the checking of an ID code, and provides an advantage in that the starting performance as good as that in an engine without immobilizer can be obtained.

What is claimed is:

1. An anti-theft apparatus for a vehicle comprising:

engine control means for immediately starting a vehicle engine by use of a starter motor in response to an ignition switch-ON operation;

means responsive to the rpm of the vehicle engine and to the output voltage of the vehicle battery for determining whether the vehicle engine is running independently of the starter motor and for supplying an engine running signal after it is determined that the engine is running independently of the starter motor;

theft detecting means operative only after occurrence of said engine running signal for determining the legitimacy of an ID signal, said theft detecting means operative to issue an output signal comprising one of an enable signal and a theft signal, the enable signal allowing the engine to continue running if said ID signal is determined to be legitimate, and the theft signal prohibiting continued running of the vehicle engine if said ID signal is determined to be illegitimate;

means responsive to an output signal from said theft detecting means that comprises said theft signal for generating a halt instruction if said ID signal has been determined to be illegitimate; and means for stalling the running engine by supplying said halt instruction to said engine control means.

2. An anti-theft apparatus according to claim 1, wherein said ID signal is code data stored in a memory in a vehicle ignition key and transmitted to said theft detecting means by a transmitter incorporated in said ignition key, said theft detecting means including receiving means for detecting said transmitted code data.

3. An anti-theft apparatus for a vehicle comprising:

engine control means for immediately starting an engine by use of a starter motor in response to a switch-ON operation;

means responsive to the rpm of the vehicle engine and to the output voltage of the vehicle battery for determining whether the engine is running independently of the starter motor and for supplying an engine running signal after it is determined that the engine is running independently of the starter motor;

theft detecting means for determining the legitimacy of an ID signal and for issuing, only after supply of said engine running signal, an output signal representative of the results of the legitimacy determination, the output signal allowing engine control to be continued by said engine control means if said ID signal is determined to be legitimate, and the output signal prohibiting engine control by said engine control means if said ID signal is determined to be illegitimate;

means jointly responsive to the supply of said engine running signal and to the issuing of said output signal from said theft detecting means for generating a halt instruction if said output signal is representative of an ID signal that is illegitimate; and means for stalling the running engine by supplying said halt instruction to said engine control means.

4. An anti-theft apparatus according to claim 3, wherein said ID signal is code data stored in a memory in a vehicle ignition key and transmitted to said theft detecting means by a transmitter incorporated in said ignition key, said theft detecting means including receiving means for detecting said transmitted code data.

5. An anti-theft apparatus for a vehicle comprising:

engine control means for immediately starting an engine by energizing a starter motor in response to a switch-ON operation;

means jointly responsive to the rpm of the vehicle engine and to the output voltage of the vehicle battery for determining whether the engine is running independently of the starter motor and for generating an engine running signal after it is determined that the engine is running independently of the starter motor;

theft detecting means operative only after occurrence of, and in response to, said engine running signal for determining the legitimacy of an ID signal and for issuing a theft signal for use in prohibiting continued engine control by said engine control means if said ID signal is determined to be illegitimate; and means for stalling the running engine by supplying a halt instruction to said engine control means in response to said theft signal, said engine continuing to run independently of said starter motor in the absence of said theft signal.

6. An anti-theft apparatus according to claim 5, wherein said ID signal is code data stored in a memory in a vehicle ignition key and transmitted to said theft detecting means by a transmitter incorporated in said ignition key, said theft detecting means including receiving means for detecting said transmitted code data.

7. An anti-theft apparatus for a vehicle comprising:

engine control means for immediately energizing a vehicle starter motor to start a vehicle engine in response to a vehicle ignition switch-ON operation;

means responsive to the rpm of the vehicle engine and the output voltage of the vehicle battery for determining whether the engine is running independently of the starter motor and for providing an engine running signal after it is determined that the engine is running independently of the starter motor;

theft detecting means for determining the legitimacy of an ID signal, said theft detecting means operative, only after occurrence of said engine running signal, to issue a theft signal for use in prohibiting continued engine control by said engine control means if said ID signal is determined to be illegitimate; and means jointly responsive to prior occurrence of said engine running signal and to the subsequent issuance of said theft signal for stalling the running engine by supplying a halt instruction to said engine control means.

8. An anti-theft apparatus according to claim 7, wherein said ID signal is code data stored in a memory in a vehicle ignition key and transmitted to said theft detecting means by a transmitter incorporated in said ignition key, said theft detecting means including receiving means for detecting said transmitted code data.

* * * * *